United States Patent [19]

Moss

[11] Patent Number: 4,795,223
[45] Date of Patent: Jan. 3, 1989

[54] SEGMENTED 3-D HOLOGRAM DISPLAY

[75] Inventor: Gaylord E. Moss, Marina del Rey, Calif.

[73] Assignee: Hughes Aircraft Company, Los Angeles, Calif.

[21] Appl. No.: 795

[22] Filed: Jan. 6, 1987

[51] Int. Cl.<sup>4</sup> ............................................. G03H 1/26
[52] U.S. Cl. .................................. 350/3.75; 340/103; 350/3.77; 350/3.85; 350/162.18; 353/14
[58] Field of Search ...................... 350/3.67, 3.7, 3.73, 350/3.77, 3.84, 3.85, 3.75, 162.18; 340/97, 103; 353/14

[56] References Cited

U.S. PATENT DOCUMENTS

| | | | |
|---|---|---|---|
| 3,560,921 | 2/1971 | Lopez | 350/3.85 |
| 3,761,156 | 9/1973 | Mohon et al. | 350/3.77 |
| 3,848,974 | 11/1974 | Hosking et al. | 353/14 |
| 3,884,553 | 5/1975 | Graser, Jr. | 350/3.84 |
| 3,945,716 | 3/1976 | Kinder | 350/174 |
| 3,949,490 | 4/1976 | Derderian et al. | 350/3.73 |
| 4,037,919 | 7/1977 | Takeda et al. | 350/3.85 |
| 4,190,832 | 2/1980 | Mohler . | |
| 4,407,564 | 10/1983 | Ellis | 350/3.77 |
| 4,643,515 | 2/1987 | Upatnieks | 350/3.67 |
| 4,688,879 | 8/1987 | Fairchild | 350/3.7 |
| 4,740,780 | 4/1988 | Brown et al. | 353/14 |

FOREIGN PATENT DOCUMENTS 60-191847 9/1985 Japan ................................... 340/103

OTHER PUBLICATIONS

Holography with Guided Optical Waves, by A. Wuetrich et al., Applied Physics 21, 55–64 (1980).

Primary Examiner—John K. Corbin
Assistant Examiner—Martin Lerner
Attorney, Agent, or Firm—John Holtrichter; A. W. Karambelas

[57] ABSTRACT

Segmented displays are provided on an automobile windshield by stacked or linearly arrayed holograms containing separate display segments selectively illuminatable by different wavelengths of light to provide a variable display. Each hologram is edge illuminated by a wavelength which differs from the wavelength used to illuminate adjacent holograms to provide, for example, a seven segment or bar graph display. A second embodiment provides a single hologram containing a seven segment digit with light beams selectively directed on the digits to display desired numerals.

33 Claims, 3 Drawing Sheets

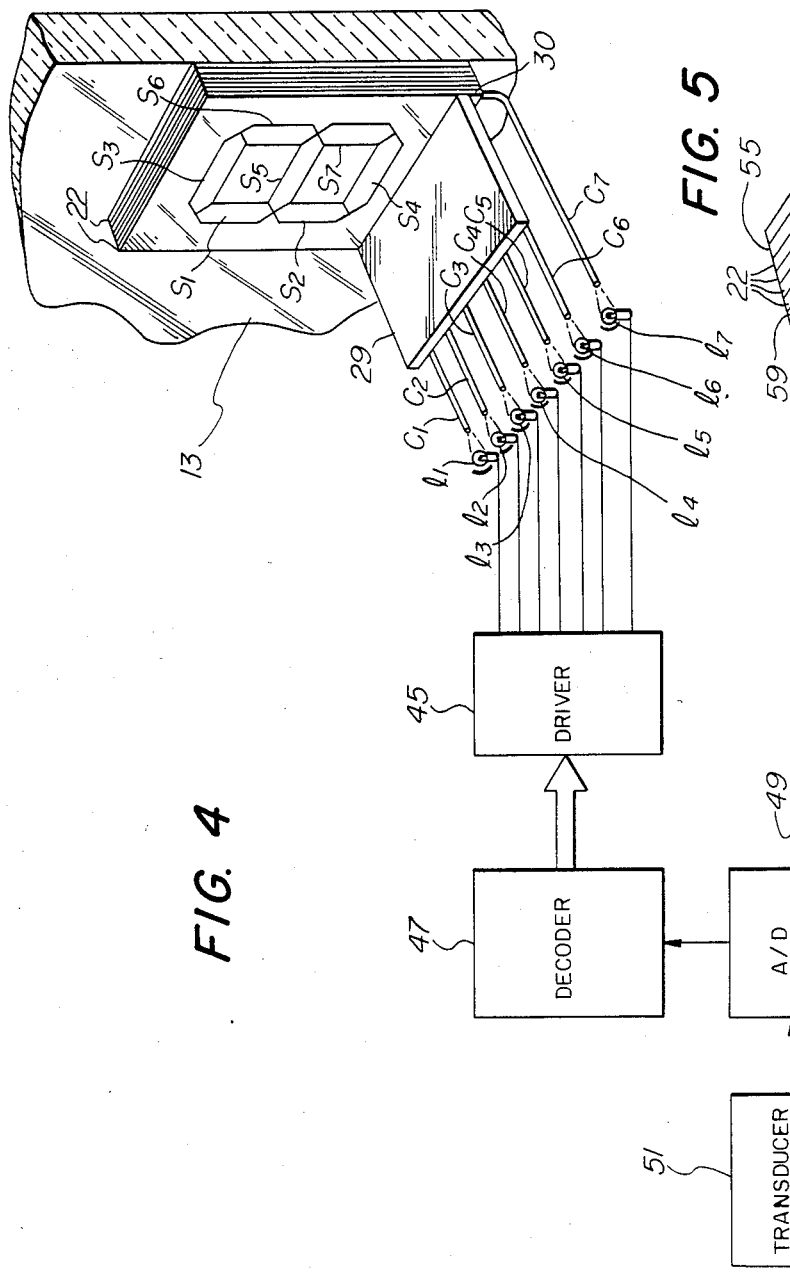
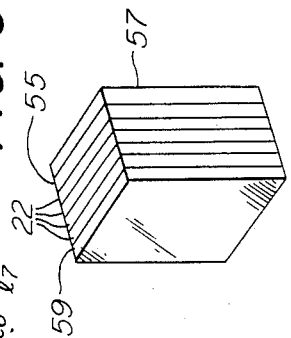
FIG. 4
FIG. 5

SEGMENTED 3-D HOLOGRAM DISPLAY

BACKGROUND OF THE INVENTION

1. Field of the Invention

The subject invention relates to displays and more particularly to a 3-D hologram head-up display with individually addressable segments.

2. Description of Related Art

Almost all major automobile manufacturers are showing head-up displays as part of their next generation concept cars. One of the main challenges to incorporating such displays in cars is to reduce the cost and aerospace complexity of head-up display technology to that of production automobile accessories.

Existing head-up displays (HUDs) use one of two basic configurations. In either case, the optical source is a fully programmable display, such as a CRT, liquid crystal, or LED array. In one configuration, a source is collimated by an optical system, and the image is reflected from a windshield combiner to the viewer. In the second configuration, the chief difference is that the combiner on the windshield is a holographic optical element that performs the collimating function. Both systems are inherently somewhat complex because of the need for a programmable display and a collimating optical system.

SUMMARY OF THE INVENTION

Accordingly, the invention provides an economical head-up display, particularly suitable for automobile use. The display appears to emanate from the automobile windshield, thus providing minimal distraction in viewing the display. The display is particularly suited to display of seven segment characters and a bar graph speedometer.

According to the invention, 3-D holograms with individually addressable segments ae used to form the display image. In this manner, both the image source and the collimating optics are contained in one inexpensive hologram assembly that can be attached in the manner of a decal if desired, for example, to an automobile windshield. The display information is changed by merely activating different illumination sources. These sources can be simple tungsten bulbs whose light is carried to the instrument panel area through optical fibers. The display thus takes up very little space inside the instrument panel, since the actual light sources can be put in any remote area where space is available. A significant advantage of this approach is that complex and expensive sources and optical systems associated with prior art head-up displays are eliminated.

In a first preferred embodiment, individual segments are provided in individually addressable edge illuminated hologram layers. In a second preferred embodiment, multiple segments are created in a single hologram layer and selectively illuminatable sources are directed to selectively illuminate the multiple segments.

BRIEF DESCRIPTION OF THE DRAWINGS

In the accompanying drawings:

FIG. 4 is a perspective sectional drawing illustrating edge illumination in the preferred embodiment;

FIG. 5 is a sectional drawing illustrating stacked hologram layers according to the preferred embodiment;

DESCRIPTION OF THE PREFERRED EMBODIMENTS

The following description is provided to enable any person skilled in the optical and automotive fields to make and use the invention, and sets forth the best modes contemplated by the inventor of carrying out his invention. Various modifications, however, will remain readily apparent to those skilled in the art since the generic principles of the present invention have been defined herein specifically to provide a relatively economical and easily manufactured segmented hologram display.

Figure 1:
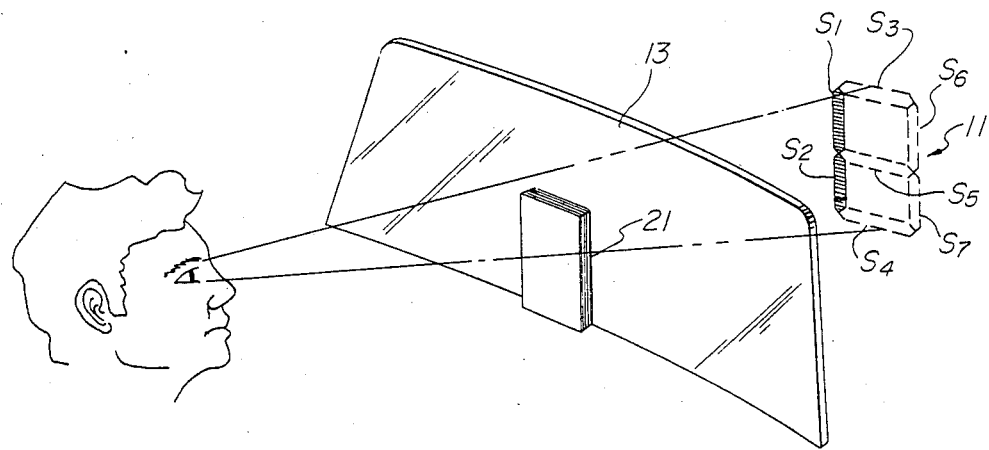
FIG. 1 is a schematic of a display according to the preferred embodiment.
Figure 2:
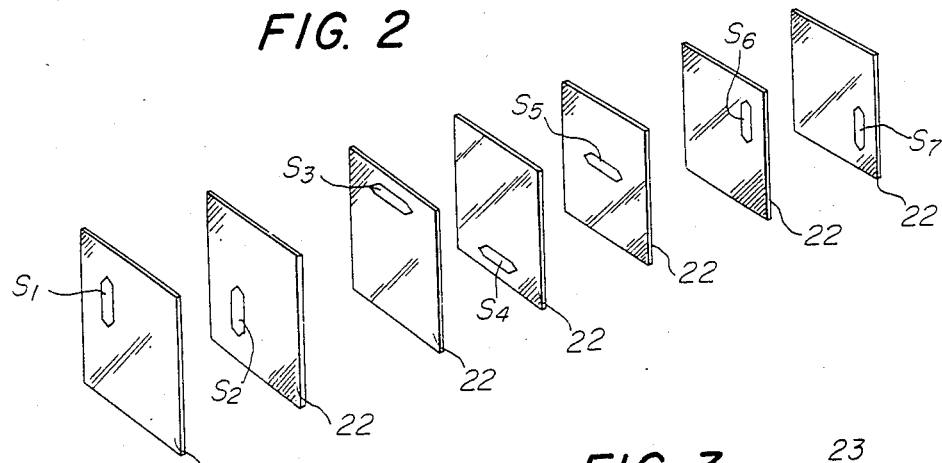
FIG. 2 is a perspective of elements of a seven segment display according to the preferred embodiment.

The approach of the first preferred embodiment is to attach to a windshield 13 a series of 3-D holographic images that can be illuminated, or turned on, selectively to display desired information. One approach is shown in FIG. 1, in which a seven segment digit 11 is created on the windshield 13, with each segment $S_1 \ldots S_7$ formed by a composite hologram 21. The composite hologram 21 includes seven holograms 22, as illustrated in FIG. 2. Each hologram 22 provides a separate segment $S_1 \ldots S_7$ and is provided with means to enable it to be addressed selectively via suitable illumination sources. FIG. 1 shows two segments $S_1$, $S_2$ illuminated to form the digit "1".

Three methods for providing selective illumination of each segment are: (1) wavelength selectivity in which each segment is made to reconstruct at a different illumination wavelength; (2) angular selectivity in which each segment is made to reconstruct at a different reference beam angle; and (3) edge illumination in which each segment is formed in a different hologram film layer which is turned on by coupling the reference beam into the edge of that particular film layer.

The seven holograms 22 of FIG. 2 each have a diffraction grating for reproducing one of the seven segments $S_1 \ldots S_7$. In general, holographic procedures for forming holograms with wavelength and angular selectivity can be found in known reference works, such as "Optical Holography" by Collier et al., Academic Press, New York, N.Y. (1971). A paper that discusses edge coupling of holograms is "Applied Physics 21", 55-64 (1980) and "Holography with Guided Optical Waves" by A. Wuthrick and W. Lukosz. Additionally, the holographic image can be developed to be particularly sensitive to only a predetermined bandwidth of the illumination source. As is well-known in the holographic field, a hologram can be made to operate over a broader wavelength band giving increased brightness for a broadband source, but trading off increased coloration provides a lower photo-optic see-through capability.

Figure 3:
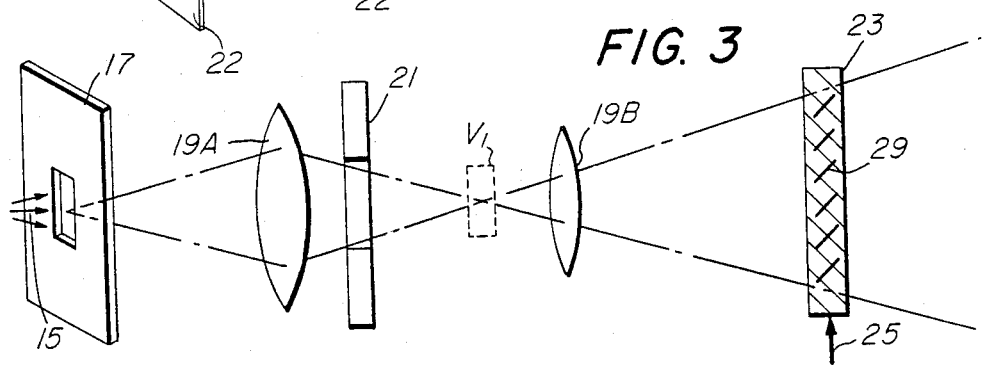
FIG. 3 is a schematic apparatus for creating holograms.

The technique for creating each hologram 22 is illustrated in FIG. 3. As shown, a lser source 15 shines a light through a suitable diffuse negative 17 containing the image of a segment S. The light from the negative 17 is focused by a lens 19A, through an aperture 21 onto a hologram material 23. Alternatively, for a true 3-dimensional image, the negative 17 could be replaced by a 3-dimensional object illuminated by reflected laser light. A reference beam 25 is directed perpendicular to the edge of the hologram material 23. As is well-known, the interference between the source light 15 and the reference beam 25 forms a diffraction grating 29. The diffraction grating 29 recreates a virtual image $V_1$ of the segment S, when edge-lit by a suitable light source. The aperture 21 and field lens 19B are preferably selected to confine the holographic image to the SAE Eyelipse.

FIG. 4 illustrates the edge illumination of a seven segment hologram arrangement according to the preferred embodiment. In FIG. 4, the holograms 22 are of exaggerated thickness for illustrative purposes. As shown, the seven hologram layers 22 are sandwiched adjacent one another and attached to the automobile or other windshield 13. The bottom edge 30 of each hologram 22 extends below the top edge of the dash 29. The bottom edge 30 of each segment 22 is edge illuminated by light conducted to it by a respective light conduit $C_1$ ... $C_7$. The light conduit may be fiberoptical if desired. Each light conduit receives light from a respective light source $1_1$ ... $1_7$. The light sources $1_1$ ... $1_7$ are coupled into their respective hologram film layers by means of a prism or coupling hologram.

The light sources $1_1$ ... $1_7$ are selectively illuminated by driver circuits 45, which are activated by a decoder 47 in response to a binary output from an analog to digital conversion circuit 49. The converter circuit 49 converts the output of a transducer 51 measuring a parameter of automobile operation to a binary output. Such circuitry is of course well-known in the art. Alternatively the transducer could produce a direct digital output.

FIG. 5 illustrates in more detail the structure for applying the holograms 22 to the windshield. A mylar substrate 55 is attached to the windshield 13 by a layer of optical cement 57. The hologram film layers 22 can be formed of conventional film coatings, such as poly-N-vinyl carbazole or a dichromated gelatin, such as disclosed in known reference books, e.g., "Dichromated Gelatin For The Fabrication Of Holographic Optic Elements" by Chang et al., Applied Optics, Vol. 18, pgs. 2407-17 (1979). An anti-abrasive film layer 59, for example of silicon nitride or silicon dioxide is then deposited on the exposed surface of the last hologram 22 to provide an anti-abrasive coating for protection of the hologram layers 22. It may be noted that the hologram layers 22 are of a thickness on the order of 30 microns, so that a very thin, unobtrusive, transparent display is provided.

As can be appreciated, it is within the ordinary skill of this art to provide two or more separate diffraction gratings in the same common holographic layer that can be independently activated by different wavelengths or angles of reference beams. Where images or messages are contained within a holographic layer, the physical envelope of the windshield should be taken into consideration during the construction of the hologram to compensate for any distortion. For example, the object source can be distorted to compensate for the effect of the window curvature, or the holographic layer can be physically defined in the same position that it will be mounted on the window to permit the development of the diffraction gratings to take into account the non-planar configuration.

The segmented technique of the preferred embodiment is not restricted to the display of 7-segment digits, but may be used for many kinds of selectable displays. Another example is the bar graph speedometer of FIG. 6, in which horizontal segments $S_{10}$, $S_{11}$, $S_{12}$ ... are illuminated by successive iterations of the wavelength set $\lambda_1$, $\lambda_2$, $\lambda_3$. The result is a holographic image in the shape of a bar graph speedometer.

Figure 6:
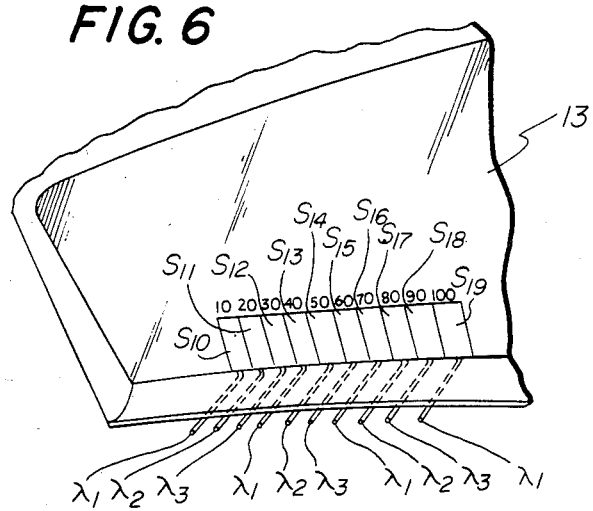
FIG. 6 is a schematic diagram of a bar graph speedometer according to the preferred embodiment.

In FIG. 6, each horizontal segment $S_{10}$, $S_{11}$ ... is provided by a separate hologram created and attached to the windshield according to the techniques described above. Again a plurality of light sources provide a repeating combination of wavelengths, $\lambda_1$, $\lambda_2$, $\lambda_3$, to selectively illuminate the horizontal segments forming the bar graph display. A suitable decoder 61 again selects the light sources which are activated at any one time in response to a digital output representative of vehicle speed.

Figure 7:
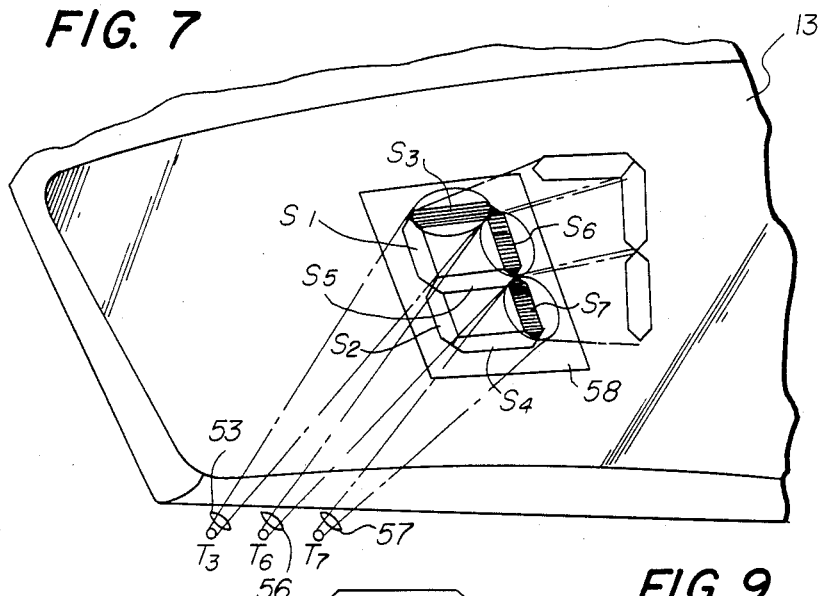
FIG. 7 is a perspective schematic design illustrating a second preferred embodiment.
Figure 8:
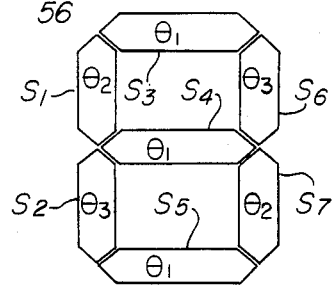
FIG. 8 is a schematic design illustrating angles assigned to beams illuminating respective display segments.

Another readily implementable embodiment is disclosed in FIGS. 7 and 8. FIG. 7 shows a single, thin film hologram 58 mounted on a windshield 13 and having seven illuminatable segments $S_1$ ... $S_7$. The display produces a seven segment stand-up 3-D image in space ahead of the windshield 13. Seven fiber optic tubes $T_1$ ... $T_7$ are positioned to illuminate the respective segments of the hologram. Only three of the sources $T_3$, $T_6$, $T_7$ are shown in FIG. 7 for purposes of clarity. Three individual segments $S_3$, $S_6$, $S_7$ are shown illuminated to create the image of the number seven "7" beyond the windshield. Depending on the construction, lenses 53, 56, 57 may be provided at the end of the fiber tubes $T_1$ ... $T_7$ to shape the illumination wavefront to match the construction reference wavefront shapes. The tubes $T_1$ ... $T_7$ are provided with individually switchable light sources, e.g., $1_1$ ... $1_7$ as shown in FIG. 4. The selectivity of segments is accomplished by varying the angle of the reference beam when the segment holograms are both made and reconstructed.

FIG. 8 shows the allocation of the angles of the illuminating beams according to the embodiment of FIG. 7. As shown, three separate beam angles $\theta_1$, $\theta_2$, $\theta_3$, are employed to allow overlay of beams for adjacent segments while providing satisfactory avoidance of cross talk.

Figure 9:
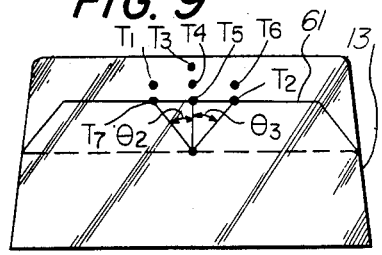
FIG. 9 is a schematic perspective depicting the arrangement of light tubes in the second preferred embodiment.

FIG. 9 illustrates the positioning of tubes $T_1$ ... $T_7$ at the angles $\theta_1$, $\theta_2$, $\theta$hd 3. A plane 61 is depicted in FIG. 9 perpendicular to the windshield 13. Tube $T_5$ is referenced as $\theta_1$. As shown, a first tube $T_5$ is positioned to direct a beam in the plane 61 and perpendicular to the windshield 13. Second and third tubes $T_2$, $T_7$ are positioned on either side of the central tube to provide beams in the plane 61 at angles $\theta_2$ and $\theta_3$. The angles $\theta_2$ and $\theta_3$ are preferably 30°. With these initial positions established, the tubes $T_2$, $T_7$ are then pivoted to direct the respective beams on appropriate segments, e.g., $S_2$, $S_7$ as indicated in FIG. 8. Additional tubes $T_1$, $T_3$, $T_4$, $T_6$ are then positioned directly above the three tubes $T_7$, $T_5$, $T_2$ and appropriately pivoted to direct their beams on the remaining segments $S_1$, $S_3$, $S_4$, $S_6$. In this manner, no two adjacent segments $S_1$ ... $S_7$ are illuminated with the same beam angle.

Various alternatives can be used in the embodiments of FIGS. 7 and 8. Light emitting diodes (LED's) may be aimed directly at the segments $S_1$ ... $S_7$ to illuminate them in place of the fiber optic tubes $T_1 \ldots T_7$ and light sources $l_1 \ldots l_7$. Instead of switching the light sources $l_1 \ldots l_7$ on or off, a liquid crystal matrix can be placed in front of the tubes $T_1 \ldots T_7$ with a respective cell of the matrix forming a shutter for each tube $T_1 \ldots T_7$ which, when activated, permits the light conducted by the tubes $T_1 \ldots T_7$ to shine on its related segment.

It may be noted that to create a seven segment image at relatively far distances from the windshield, the segments $S_1 \ldots S_7$ must be selected by an illumination angle rather than by covering each segment with a separate beam as disclosed in FIG. 7. Also, the structure of FIGS. 7 and 8 can be adapted to a bar graph display, such as disclosed in FIG. 6.

The disclosed holographic displays can be relatively inexpensive in mass production with substantially little weight addition to the vehicle. They also do not occupy any substantial space in the interior of the vehicle. Finally, they do not mar the aesthetic design of the vehicle. As can be appreciated, the present invention can be provided as either a retrofit kit to modify an existing vehicle or provided as a manufactured display.

One restriction on the disclosed HUD is that a limited number of variable display sets can be presented, because of the limitation on the number of separately addressable holograms in a given area. For many applications, such as automobile speed display, this restriction is unimportant, since all the information needed can be displayed. The reduction in cost and space needed, as compared to conventional HUDs, is on the order of one to two orders of magnitude.

Various modifications to the above described invention may be readily apparent to those skilled in the optical and automotive fields in view of the above described generic concepts. Therefore, the scope fo the present invention should be interpreted solely from the following claims.

What is claimed is:

1. A substantially transparent display comprising:
 a plurality of holographically recorded segments attached to an automobile windshield and coordinately positioned such that selective illumination thereof provides a composite display, the composite varying in accordance with the selective illumination; and
 means for selectively illuminating said segments to provide a variable holographic display.

2. A substantially transparent display comprising:
 a plurality of holographically recorded segments coordinately positioned such that selective illumination thereof provides a composite display, the composite display varying in accordance with the selective illumination, said segments being responsive to different wavelengths of illumination to provide a selective display; and
 means for selectively illuminating said segments to provide a variable holographic display.

3. A substantially transparent display comprising:
 a plurality of holographically recorded segments coordinately positioned such that selective illumination thereof provides a composite display, the composite display varying in accordance with the selective illumination; and
 means for selectively illuminating said segments to provide a variable holographic display, said means for selectively illuminating comprising means for providing different wavelengths of illumination to respective ones of said segments.

4. A substantially transparent display comprising:
 a plurality of holographically recorded segments arranged to provide a succession of successively illuminatable bars and coordinately positioned such that selective illumination thereof provides a composite display, the composite varying in accordance with the selective illumination; and
 means for selectively illuminating said segments to provide a variable holographic display.

5. The display of claim 4 wherein said bars comprise a speedometer display.

6. A substantially transparent display comprising:
 a plurality of holographically recorded segments comprising a seven segment numeric display coordinately positioned such that selective illumination thereof provides a composite display, the composite display varying in accordance with the selective illumination; and
 means for selectively illuminating said segments to provide a variable holographic display.

7. A substantially transparent display comprising:
 a plurality of holographically recorded segments recorded in a single hologram coordinately positioned such that selective illumination thereof provides a composite display, the composite display varying in accordance with the selective illumination; and
 means for selectively illuminating said segments to provide a variable holographic display.

8. The display of claim 7 wherein said means for selectively illuminating comprises means or directing light beams at a plurality of different angles on each of said segments.

9. The display of claim 8 wherein said light directing means comprises:
 a plurality of light sources;
 a plurality of tube means for conducting light from said sources and directing said light toward respective said segments; and
 means for switching said light to selectively illuminate said segments.

10. The display of claim 9 wherein said segments are seven in number and wherein said plurality of angles of illumination comprise three in number.

11. The display of claim 9 further including lens means for focusing said light from said conducting means on respective said segments.

12. The display of claim 11 wherein said switching means comprises means for selectively turning said light sources on or off.

13. The display of claim 11 wherein said switching means comprises a liquid crystal matrix means for selectively transmitting said light.

14. A composite indicia display comprising:
 a plurality of hologram film layers each having a recorded holographic image, the film layers being coordinately positioned such that selective illumination thereof provides a composite display of the image recorded thereon, the composite display varying in accordance with the selective illumination; and
 means for selectively edge illuminating each of said film layers to create a plurality of composite displays therefrom.

15. The display of claim 14 wherein said means for edge illuminating comprises:
 a plurality of light sources providing source lights of different wavelengths, and light conduit means for separately conducting each source light to one of said film layers and applying the source light as an edge illumination thereto.

16. The display of claim 14 wherein said plurality of hologram film layers form a seven segment display and wherein said means for selectively illuminating selectively illuminates each of said seven segments.

17. The display of claim 15 wherein said different wavelengths comprise three different wavelengths and wherein said sources and light conduit means are arranged such that no two adjacent film layers are edge illuminated by the same wavelength.

18. The display of claim 17 wherein each of said hologram film layers contains a hologram representing one segment of a seven segment display.

19. The display of claim 17 wherein said hologram film layers are attached to an automobile windshield.

20. The display of claim 19 wherein mylar film and optical cement layers are attached between said windshield and said hologram film layers.

21. A composite indicia display comrising:
a plurality of holograms each having a recorded holographic image, the plurality of holograms being coordinately positioned such that selective illumination thereof provides a composite display of the images recorded thereon, the composite display varying in accordance with the selective illumination; and
means for selectively edge illuminating each of said holograms.

22. A composite indicia display comprising:
a plurality of adjacent hologram film layers each having a recorded holographic image, the plurality of holograms being coordinately positioned such that selective illumination thereof provides a composite display of the images recorded thereon, the composite display varying in accordance with the selective illumination; and
means for selectively edge illuminating each of said film layers.

23. The display of claim 22 wherein said means for edge illuminating comprises:
a plurality of light sources providing source lights of different wavelengths; and
light conduit means for separately conducting each source light to one of said film layers and applying the source light as an edge illumination thereto.

24. The display of claim 23 wherein said different wavelengths comprise three different wavelengths and wherein said sources and light conduit means are arranged such that no two adjacent film layers are edge illuminated by the same wavelength.

25. The display of claim 24 wherein each of said adjacent film layers contains a hologram representing a portion of a bar graph display.

26. The display of claim 25 wherein each hologram represents a portion of an automobile speedometer display.

27. An improved substantially transparent holographic display assembly, comprising:
a plurality of holographic members;
a plurality of holographically recorded image segments, each image segment being recorded on a separate holographic member;
means for mounting the holographic members to provide a seven-segment numeric arrangement capable of providing a composite image display by arranging them in a composite stack with the segment images displaced from each other along the depth of the stack; and
means for selectively illuminating each segment independent of the other segments by selectively illuminating each image segment through an edge of its holographic members.

28. An improved substantially transparent holographic display for mounting on a window of a vehicle to provide instrument readings of a variable type to a driver, comprising:
a plurality of thin holographic members having perimeter edges;
a plurality of holographically recorded image segments in the form of a seven-segment display, each image segment being recorded on a separate holographic member;
means for mounting the holographic members to provide a composite image display of image segments with the image segments being displaced from each other along an axis of viewing of the drivers; and
means for selectively illuminating each segment independent of the other segments by selectively illuminating each image segment through an edge of its holographic members.

29. An improved substantially transparent holographic display for mounting on a window of a vehicle to provide instrument readings of a variable type to a driver, comprising:
a plurality of thin holographic members having perimeter edges;
a plurality of holographically recorded image segments, each image segment being recorded on a separate holographic member;
means for mounting the holographic members to provide a composite image display of image segments with the image segments being displaced from each other along an axis of viewing of the drivers; and
means for selectively illuminating each segment independent of the other segments by selectively illuminating each image segment through an edge of its holographic members, said means comprising a plurality of individually illuminatable light sources and optic fibers conducting light from each light source to the edge of a single holographic member.

30. An improved substantially transparent holographic speedometer display for mounting on a front window of a vehicle to provide instrument readings of speed to a driver from a transducer measuring the vehicle speed, comprising:
a plurality of thin holographic members;
a plurality of holographically recorded image segments, each image segment being recorded on a separate holographic member and representative of a segment of numeric members;
means for mounting the holographic members to provide a composite image display of image segments with the image segments being displaced from each other along an axis of viewing, and
means for selectively illuminating each segment independent of the other segments whereby the illumination of selected segments can provide a numeric image representative of the speed of the vehicle.

31. The improved holographic display of claim 30 wherein the means for selectively illuminating each segment indendent of the other segments comprises a means for selectively edge-illuminating each holographic member.

33. The improved holographic display of claim 30 wherein the composite image display comprises a seven-segment numeric display.

33. An improved substantially transparent holographic display for mounting on a windshield of a vehicle to provide a variable readout to a driver from a transducer, comprising:
- a plurality of holographic members directly affixed to the windshield in a stacked arrangement, each holographic member having holographically recorded thereon, with a predetermined wavelength, a single segment of a seven-segment numeric display, each adjacent holographic member in the stack being recorded with a different wavelength;
- means for providing the predetermined wavelengths, and
- means for selectively edge-illuminating each holographic member including a plurality of optic fibers conducting light from the providing means to provide a composite display.

* * * * *